United States Patent
Harriman et al.

(10) Patent No.: US 7,057,381 B2
(45) Date of Patent: Jun. 6, 2006

(54) POWER SUPPLY CONTROLLER AND METHOD

(75) Inventors: Paul J. Harriman, Goodyear, AZ (US); J. Eric Lindberg, East Greenwich, RI (US); Eric Reicher, Portsmouth, RI (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 78 days.

(21) Appl. No.: 10/900,167

(22) Filed: Jul. 28, 2004

(65) Prior Publication Data
US 2006/0022658 A1    Feb. 2, 2006

(51) Int. Cl.
*G05F 1/40*    (2006.01)

(52) U.S. Cl. ................................. 323/285; 323/282

(58) Field of Classification Search ................. 323/222, 323/271, 272, 266, 282–286, 265
See application file for complete search history.

(56) References Cited

U.S. PATENT DOCUMENTS

| | | | | |
|---|---|---|---|---|
| 5,905,370 A | * | 5/1999 | Bryson | 323/283 |
| 6,424,132 B1 | * | 7/2002 | Wrathall | 323/282 |
| 6,674,325 B1 | * | 1/2004 | Chen et al. | 330/124 D |
| 6,894,466 B1 | * | 5/2005 | Huang et al. | 323/272 |

\* cited by examiner

Primary Examiner—Rajnikant B. Patel
(74) Attorney, Agent, or Firm—Robert F. Hightower

(57) ABSTRACT

In one embodiment, a power supply controller is configured to amplify a feedback signal and a voltage reference signal by gains that are substantially constant over an operating frequency of the power supply controller.

20 Claims, 4 Drawing Sheets

POWER SUPPLY CONTROLLER AND METHOD

BACKGROUND OF THE INVENTION

The present invention relates, in general, to electronics, and more particularly, to methods of forming semiconductor circuits.

In the past, the semiconductor industry utilized various methods and circuits for forming the error amplifier of a power supply control system. Advances in technology increased the demand for more efficient and more accurate power supply control systems. Often, systems required the ability to change the value of the output voltage of the power supply system under the control of an external control system such as a micro-computer. The external control system typically sent a signal to the power supply control system in order to change the value of the output voltage. FIG. 1 illustrates an error amplifier of a typical prior power supply control system 10. System 10 had a PWM control section 17, a power driver stage 18, an error amplifier 14, and a reference voltage 16. Error amplifier 14 included an operational amplifier 15 in addition to a compensation and gain control network that included a first impedance 12 and a second impedance 13. Impedances 12 and 13 typically included resistors and capacitors that were used to provide high frequency stability for changes in the input voltage (Vin) applied to amplifier 14. One problem with these power supply controllers was accuracy. Often, the error amplifier circuit had tracking errors which caused the output voltage to have inaccurate and unstable changes when the control system requested a change in the value of the output voltage. Such inaccuracy and instability detrimentally affected the operation of the control system that used the output voltage of the power control system.

Accordingly, it is desirable to have a power supply controller that does not have tracking errors, that can accurately change the value of the output voltage, and that maintains stability during the output voltage change.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor. Although the devices are explained or illustrated herein as certain N-channel or P-Channel devices, a person of ordinary skill in the art will appreciate that complementary devices are also possible in accordance with the present invention.

DETAILED DESCRIPTION OF THE DRAWINGS

Figure 2:
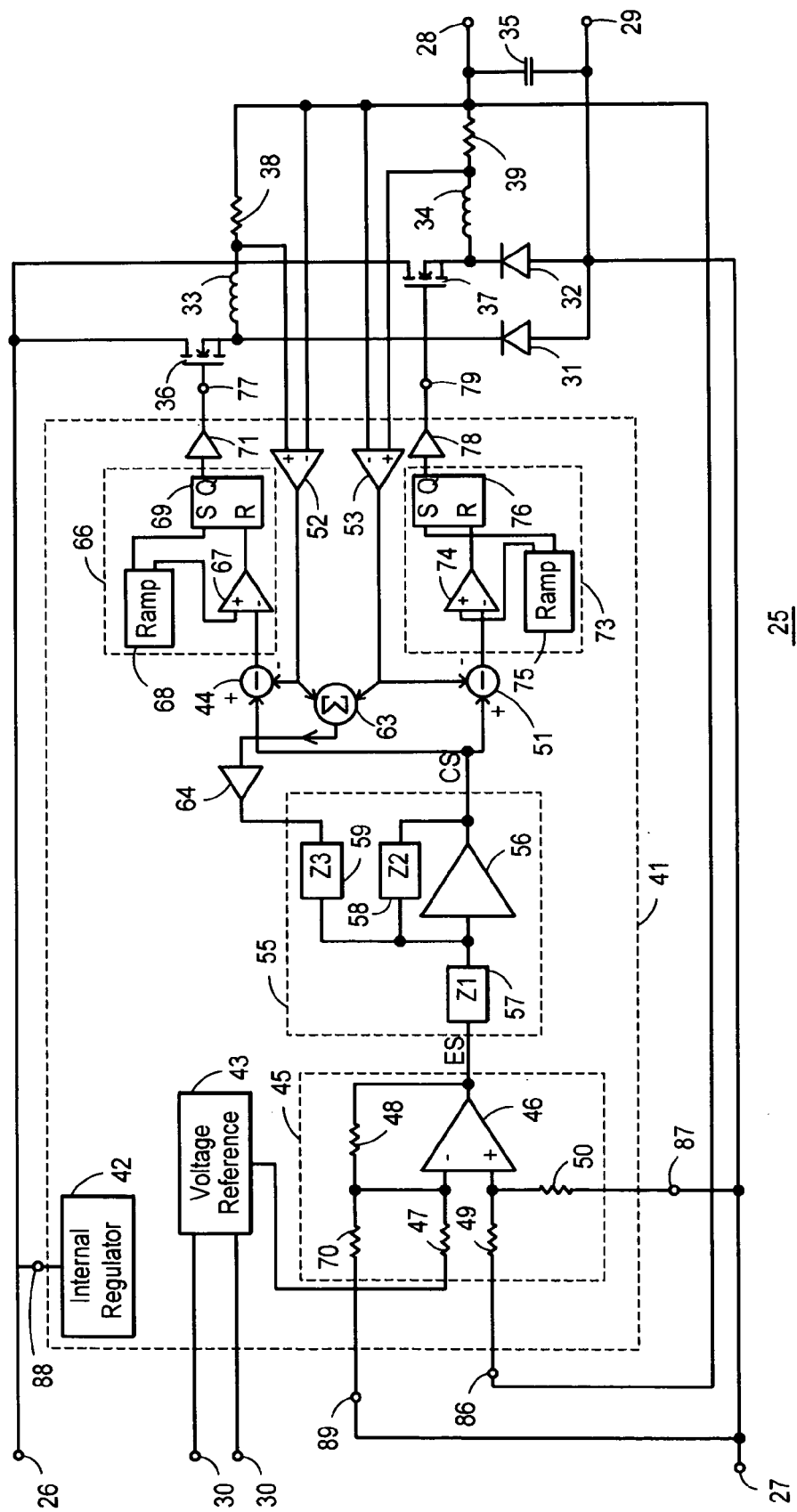
FIG. 2 schematically illustrates an embodiment of a portion of a power supply control system in accordance with the present invention.

FIG. 2 schematically illustrates an embodiment of a portion of a power supply control system 25 that accurately and stably changes an output voltage of system 25 in response to changes in a reference voltage of system 25 and in response to changes of the output voltage of system 25. System 25 includes a differential error amplifier 45 that provides a substantially constant gain for changes in both a feedback signal and the reference voltage over the operating frequency of the PWM control signals formed by system 25. This functionality facilitates system 25 accurately, stably, and predictably controlling the value of the output voltage as will be seen further hereinafter.

System 25 receives power between a power input 26 and a power return 27, and provides an output voltage between an output voltage terminal 28 and output common terminal 29. A power supply controller 41 of system 25 is formed and configured to control the value of the output voltage. System 25 typically includes energy storage inductors 33 and 34, an energy storage capacitor 35, a first power switch or power transistor 36, a second power switch or power transistor 37, a first current sense resistor 38, a second current sense resistor 39, and diodes 31 and 32. Transistors 36 and 37 preferably are MOS power transistors that are connected to respective inductors 33 and 34 in order to provide a charging current to charge capacitor 35 and form the output voltage between terminals 28 and 29. In other embodiments, the power switch may be a bipolar transistor or other type of switch that can enable and disable the charging current flow through inductors 33 and 34. Current sense resistors 38 and 39 form a first current sense signal and a second current sense signal, respectively, that are representative of the charging current. In the preferred embodiment of system 25, the value of the feedback signal is small, consequently a differential feedback signal is used to improve the noise immunity and accuracy of system 25. In this preferred embodiment, the output voltage between terminals 28 and 29 is received as a differential feedback (FB) signal or feedback signal between feedback inputs 86 and 89 of controller 41. This differential feedback signal is representative of the output voltage. In other embodiments, the feedback signal may be single ended and applied only to input 86, thus, resistor 70 and input 89 would be omitted. Transistors 36 and 37, resistors 38 and 39, diodes 31 and 32, and inductors 33 and 34 typically are external to controller 41 although in some cases transistors 36 and 37 may be a part of controller 41.

Controller 41 includes differential error amplifier 45, a compensation amplifier 55, a voltage reference generator or reference 43, subtractor circuits or subtractors 44 and 51, a summing circuit 63, current sense amplifiers 52 and 53, a buffer 64, a first pulse width modulated (PWM) controller or PWM controller 66, a second PWM controller 73, a first power switch driver 71, and a second power switch driver 78. Controller 41 also typically includes an internal regulator 42 that is formed to provide an internal operating voltage for elements within controller 41 including differential error amplifier 45, compensation amplifier 55, PWM controller 66, PWM controller 73, and reference 43. Although not shown for clarity of the drawing, regulator 42 typically is connected between a power input 88 and a power return 87 of controller 41. Return 87 generally is connected to return 27. In the preferred embodiment of system 25, return 27 is connected to terminal 29 so that the output voltage is referenced to power return 27. In other embodiments, the output voltage may be isolated from the input voltage and terminal 29 would be isolated from return 27. Reference 43 provides a reference voltage on an output of reference 43. The value of the reference voltage can be changed externally to controller 41 through a plurality of control inputs 30 of controller 41. Typically, inputs 30 are digital signals that are received by reference 43. Changing the value of the signal on inputs 30 changes the value of the reference voltage on the output of reference 43.

System 25 is illustrated to have a plurality of power control channels including a first power control channel that includes controller 66, driver 71, and a first power stage of transistor 36 and inductor 33, and a second power control channel that includes controller 73, driver 78, and a second power stage of transistor 37 and inductor 34. The PWM control signals from the PWM controllers generally are formed to enable the power switches at different times and are often referred to as operating with different phases. In other embodiments, system 25 may have more than two power control channels or may have only one. PWM controller 66 includes a PWM comparator 67, a PWM ramp generator or ramp 68, and a PWM latch 69. Similarly, PWM controller 73 includes a PWM comparator 74, a ramp generator or ramp 75, and a PWM latch 76. Ramps 68 and 75 generate a clock signal that is used to set respective latches 69 and 76, and also generate a ramp signal that is applied to an input of respective comparators 67 and 74. Setting latches 69 and 76 drives the outputs of drivers 71 and 78 high to begin enabling transistors 36 and 37, respectively. The output of comparators 67 and 74 are used to clear respective latches 69 and 76 and begin disabling respective transistors 36 and 37. Controllers 66 and 73 generate PWM control signals on a Q output of respective latches 69 and 76 that are used to control respective transistors 36 and 37. Transistor drivers 71 and 78 receive the PWM control signals from respective controllers 66 and 73 and form respective first and second PWM drive signals for enabling and disabling respective transistors 36 and 37. The first and second PWM drive signals generally are coupled to respective first and second drive outputs 77 and 79 of controller 41. Such PWM controllers, transistor drivers, PWM control signals, and PWM drive signals are well known to those skilled in the art. Current sense amplifiers 52 and 53 are configured to receive the current sense signals across respective resistors 38 and 39 and responsively form respective first and second current feedback signals on the output of respective amplifiers 52 and 53. Summing circuit 63 receives the first and second current feedback signals and responsively sums them to form a composite current feedback signal on an output of circuit 63. The composite current feedback signal is buffered by a buffer 64. The composite current feedback signal is used by amplifier 55 as will be seen further hereinafter.

Figure 1:
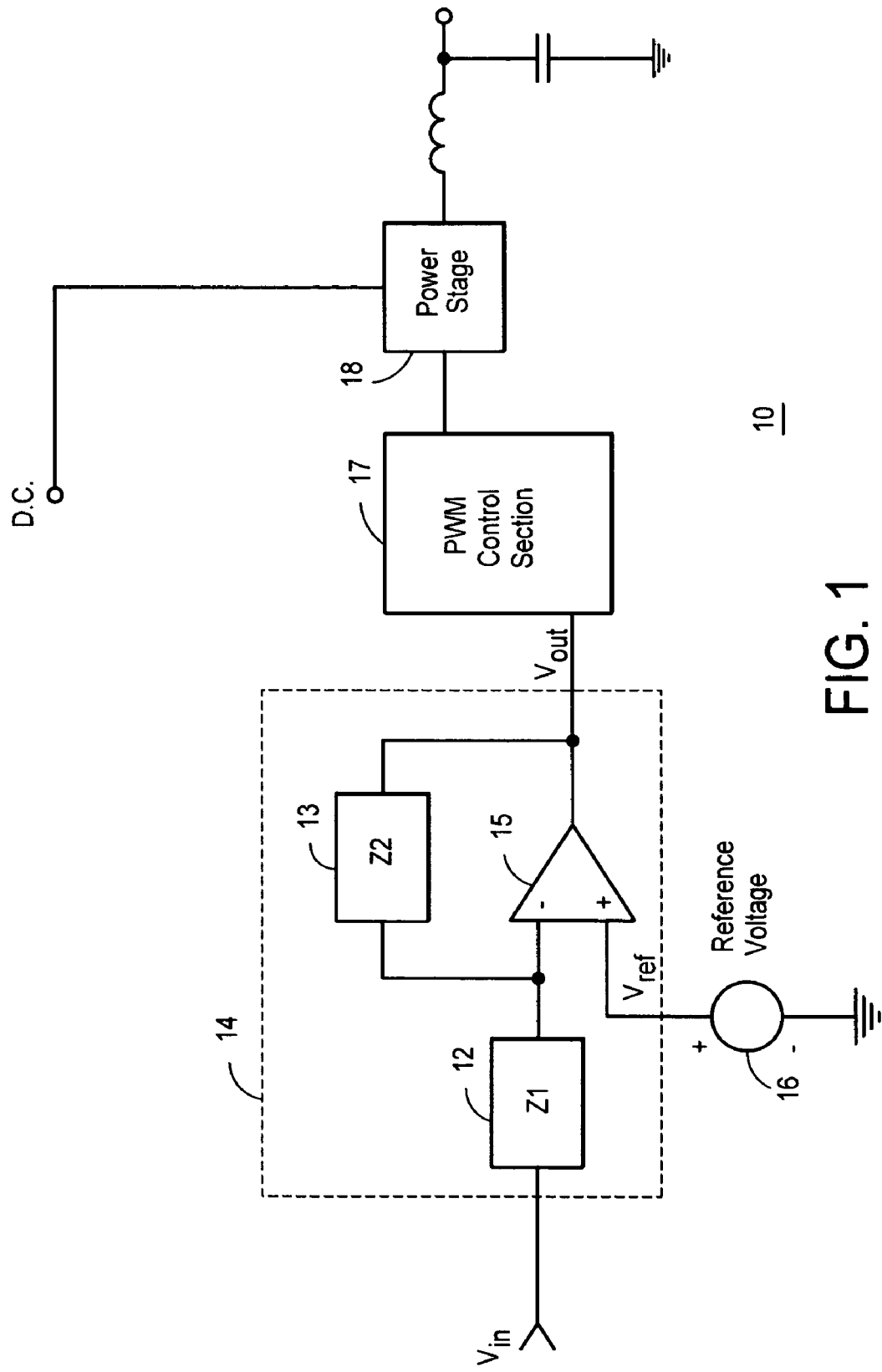
FIG. 1 schematically illustrates an embodiment of a portion of a prior art power supply control system.

In the typical prior art power supply systems, such as is illustrated in FIG. 1, a feedback voltage typically was applied to one input of an amplifier and a reference voltage was applied to the opposite input in order to form an error voltage. The signal compensation of the amplifier caused the feedback signal to be amplified with a gain that had a variation with frequency that was different than the frequency dependence of the gain used to amplify the reference voltage. If the reference voltage changed, the change in the reference voltage was amplified with a gain that varied over frequency differently than the gain used for amplifying the feedback signal. This different frequency dependency caused tracking errors in the output voltage as a result of the changes in the value of the reference voltage. Referring to the prior art system of FIG. 1, the value of impedances 12 and 13 gave the control loop of controller 10 a phase shift that provided stability at higher frequencies. However, the value of impedances 12 and 13 also determined the gain of the input voltage (Vin) applied to amplifier 14. The transfer function of amplifier 14 was represented by:

$$Vout = Vref((Z2/Z1)+1) - Vin(Z2/Z1)$$

Where:
Vout—was the value of the output voltage of amplifier 14;
Vin—was the value of the input voltage applied to amplifier 14;
Z1—was the value of impedance 12;
Z2—was the value of impedance 13; and
Vref—was the value of reference voltage 16.

The transfer function of amplifier 14 showed that amplifier 14 unequally amplified the value of the input voltage and the value of the reference voltage at different frequencies. Consequently, when the value of the reference voltage changed the change did not affect the output voltage of the error amplifier to the same degree as a change in the input voltage. This difference in the amplification of the reference voltage and the input voltage was often referred to as the tracking error. Each time the reference voltage changed, the control loop of the power supply controller had a different response time and damping factor than it did for changes in the input voltage. For example, the control loop may have been under-damped for changes in the reference voltage but may have been critically-damped for changes in the input voltage. The different control loop responses resulted in the power supply system having a non-stable output voltage that had a large variance from the desired value of the output voltage whenever the reference voltage changed. Consequently, in a system where the reference voltage periodically changed, the output voltage was inadequately regulated.

Referring back to FIG. 2, it has been found that configuring the error amplifier to have substantially constant gain for both the reference voltage and for the feedback signal over the operating frequency of controller 41 improves the transient response of system 25 in addition to the stability and accuracy of the output voltage of system 25. Consequently, differential error amplifier 45 is configured to have substantially constant gain for the reference voltage (Vref) and for the feedback (FB) signal over the operating frequency range of the PWM control signals from controllers 66 and 73. With such a configuration, the effect of changes in the value of the reference voltage and changes in the FB signal is constant over the operating frequencies, thus, controller 41, including PWM controllers 66 and 73, regulate the value of the output voltage in the same manner responsively to changes in the value of the reference voltage and to changes in the value of the output voltage. The approximately constant gain generally is over a frequency range of about dc to twenty (20) MHz and preferably is from dc to at least ten (10) Mhz. In the preferred embodiment, amplifier 45 has unity gain over this frequency range.

Differential error amplifier 45 receives the differential feedback (FB) signal between the inverting and non-inverting inputs of amplifier 45. The feedback signal is referenced to return 87 through resistor 48 and the reference voltage is referenced to return 87 through resistor 50. Thus, amplifier 45 subtracts the value of the reference voltage from the value of the feedback signal, and responsively amplifies the difference between the values of the reference voltage and the feedback signal. Differential error amplifier 45 includes an operational amplifier 46, a first gain resistor 47, a second gain resistor 48, a third gain resistor 49, and a fourth gain resistor 50. Resistors 47, 48, 49, 50, and 70 are selected to provide the desired value of the gain from the feedback signal and the reference voltage to the error signal. The resulting transfer function of amplifier 45 is:

$$ES=(FB1(R50/(R50+R49)))(1+(R48/R47)+(R48/R70))-FB2(R48/R70)-Vref(R48/R47)$$

Where:

ES—is the value of the output voltage of amplifier 45;
FB1—is the value of the feedback signal applied to input 86 relative to return 87;
FB2—is the value of the feedback signal applied to input 89 relative to return 87;
Vref—is the value of the reference voltage applied to the second input of amplifier 45;
R47—is the value of resistor 47;
R48—is the value of resistor 48;
R49—is the value of resistor 49;
R50—is the value of resistor 50; and
R70—is the value of resistor 70.

The goal is to configure amplifier 46 and resistors 47–50, and 70 so that the gain for changes in the FB signal and the gain for changes in the reference voltage are constant over the operating frequency of the PWM control signals. However, as is well known in the art there are always minor variances that prevent the gains from being identically equal. It is well established in the art that variances of up to about ten percent (10%) are regarded as reasonable variances from the ideal goal of exactly constant. In the embodiment of controller 41 formed on a semiconductor die, resistors 47–50 and 70 typically are internal to the semiconductor die but may be external in some embodiments.

Compensation amplifier 55 includes an amplifier 56 that has a frequency compensation network that includes first impedance 57 and second impedance 58 that both are selected to provide high-frequency stability for the control loop of system 25 and to provide a high gain at low frequencies in order to provide good DC regulation for system 25. In the embodiment of controller 41 formed on a semiconductor die, the components of impedances Z1 and Z2 typically are external to the semiconductor die. Compensation amplifier 55 receives the error signal (ES) from differential error amplifier 45 and compensates the signal to form a compensated signal (CS) that provides the poles and zeros that are necessary to generate the desired stability. Thus, amplifier 55 applies a varying phase with frequency to the received ES signal over at least a portion of the operating frequency range of controller 41. The compensated signal (CS) from the output of compensation amplifier 55 is received by subtractors 44 and 51 which subtracts the value of the respective first and second current feedback signals in order to provide controller 41 with forced current sharing between the channels of system 25 and increased output voltage stability. The current corrected signals from subtractors 44 and 51 are received by respective comparators 67 and 74 of controllers 66 and 73, respectively. The value of the current corrected signal sets the value at which comparators 67 and 74 clear respective latches 69 and 76 and begin disabling respective transistors 36 and 37.

The summed current sense signal from the output of buffer 64 is received by third impedance 59 and the output of impedance 59 is summed with the compensated signal (CS) to include the current control information within the compensated signal (CS). Third impedance 59 is also a portion of amplifier 55. The value of impedances 57 and 58 are selected to provide the desired high-frequency stability and high dc gain for compensation amplifier 55. The value of impedance 59 is selected to provide a controlled output impedance for system 25. Such summing circuits and buffers are well known to those skilled in the art. In some embodiments, circuit 63, buffer 64, and impedance 59 may be omitted to configure controller 41 with only voltage mode control. As can be seen, forming amplifier 45 to subtract the reference voltage from the error signal and forming amplifier 55 to provide separate signal compensation allows amplifier 45 to amplify changes in the reference voltage with a first gain that is substantially constant over the operating frequency and to amplify changes in the feedback signal with a second gain that is substantially constant over the operating frequency. Additionally, the frequency compensation provided by impedances 57, 58, and 59 can be change or modified without affecting the gain vs frequency relationships between the reference voltage and the feedback voltage. The resulting transfer function of amplifier 45 is:

$$ES = (R50(((FB(86)(R54)) + ((Vof)(R49)))/$$
$$(((R50)(R54)) + ((R49)(R50)) + ((R49)(R54)))))$$
$$(1 + (R48/R47) + (R48/R70)) - FB(89(R48/R70) - Vref(R48/R47).$$

Where:

ES—is the value of the output voltage of amplifier 45;
FB—is the value of the feedback signal applied to input 86 relative to return 87;
FB2—is the value of the feedback signal applied to input 89 relative to return 87;
Vref—is the value of the reference voltage applied to the second input of amplifier 45;
R47—is the value of resistor 47;
R48—is the value of resistor 48;
R49—is the value of resistor 49;
R50—is the value of resistor 50;
R70—is the value of resistor 70; and
Vof—is the value of the offset voltage.

In order to provide the hereinbefore described functionality, an inverting input of amplifier 46 is commonly connected to a first terminal of resistors 47, 70, and 48. A second terminal of resistor 70 is connected to input 89 of controller 41. A second terminal of resistor 48 is connected to the output of amplifier 46 and to a first terminal of impedance 57. A second terminal of resistor 47 is connected to the output of reference 43. A non-inverting input of amplifier 46 is commonly connected to a first terminal of resistors 49 and 50. A second terminal of resistor 49 is connected to feedback input 86 and a second terminal of resistor 50 is connected to return 87. An input of regulator 42 connected to input 88 of controller 41. A second terminal of impedance 57 is commonly connected to an inverting input of amplifier 56, to a first terminal of impedance 59, and to a first terminal of impedance 58. A second terminal of impedance 58 is commonly connected to the output of amplifier 56, to a first input of subtractor 44, and to a first input of subtractor 51. A second terminal of impedance 59 is connected to an output of buffer 64 which has an input connected to an output of circuit 63. A second input of subtractor 44 is commonly connected to a first input of circuit 63 and an output of amplifier 52. An output of subtractor 44 is connected to the inverting input of comparator 67. A second input of subtractor 51 is commonly connected to a second input of circuit 63 and to an output of amplifier 53. An output of subtractor 51 is connected to the inverting input of comparator 74. A non-inverting input of comparator 67 is connected to a first output of ramp 68, and an output of comparator 67 is connected to a reset input of latch 69. A set input of latch 69 is connected to a second output of ramp 68, and a Q output of latch 69 is connected to an input of driver 71. An output of driver 71 is connected to output 77 of controller 41. A non-inverting input of comparator 74 is connected to a first output of ramp 75, and an output of comparator 74 is connected to a reset input of latch 76. A set input of latch 76 is connected to a second output of ramp 75. A Q output of latch 76 is connected to an input of driver 78, and an output of driver 78 is connected to an output 79 of controller 41. Inputs 30 of controller 41 are connected to the inputs of reference 43. Output 77 of controller 41 is connected to a gate of transistor 36 which has a drain connected to input 26, and a source commonly connected to a first terminal of diode 31 and to a first terminal of inductor 34. Output 79 of controller 41 is connected to a gate of transistor 37 which has a drain connected to input 26, and a source commonly connected to a first terminal of resistor 39 and to a first terminal of inductor 34. A second terminal of inductors 33 and 34 are connected to a first terminal of respective resistors 38 and 39, and to a non-inverting input of respective amplifiers 52 and 53. A second terminal of resistors 38 and 39 are connected to respective inverting inputs of amplifiers 52 and 53, and to terminal 28. A second terminal of diodes 31 and 32 are connected to terminal 29.

Figure 3:
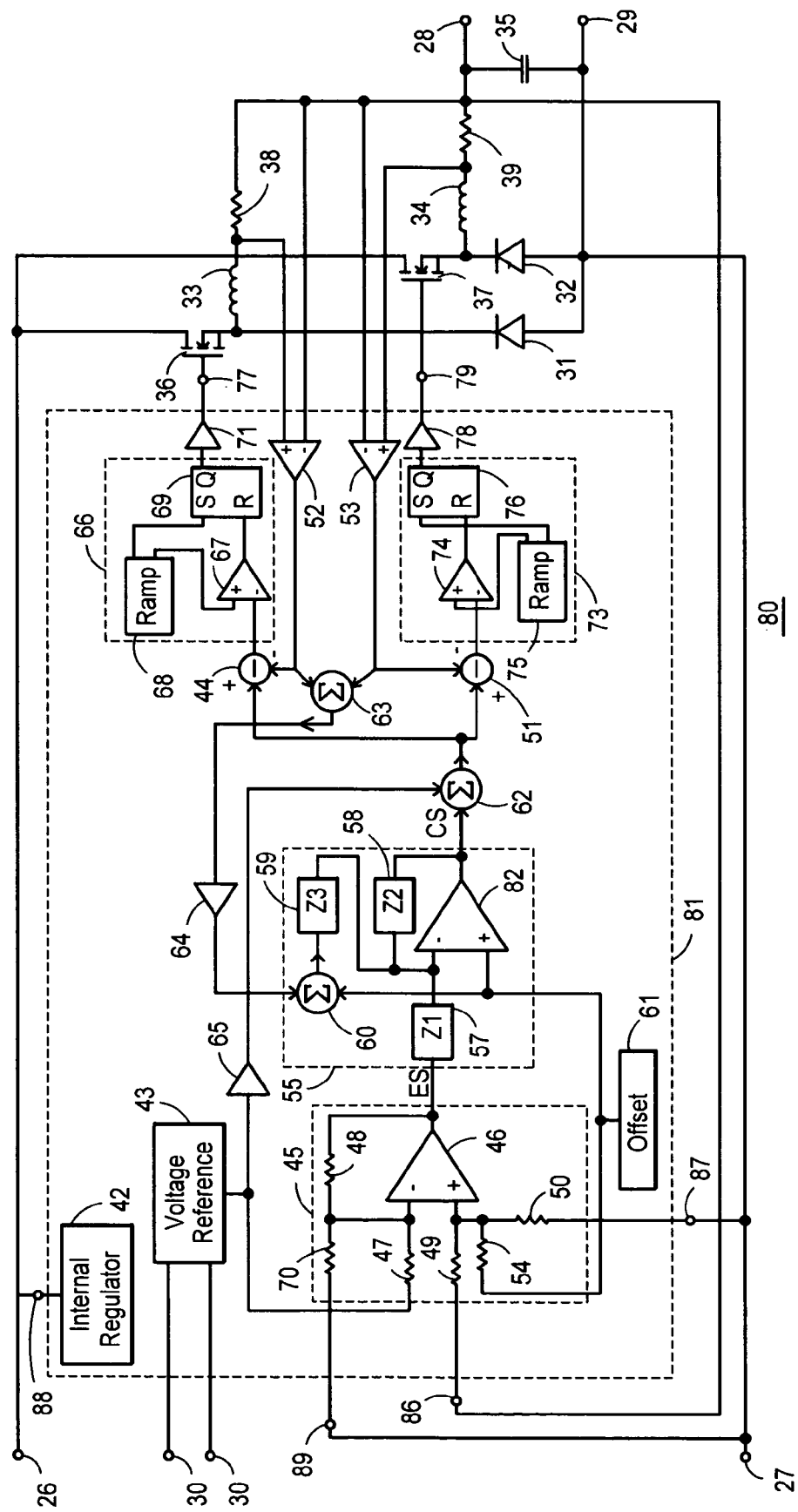
FIG. 3 schematically illustrates a portion of an alternate embodiment of the power supply control system of FIG. 2 in accordance with the present invention.

FIG. 3 schematically illustrates a portion of an embodiment of a power supply system 80 having a power supply controller 81 that are respective alternate embodiments of system 25 and controller 41. Controller 81 has an offset voltage generator 61 that is added to controller 41. Offset voltage generator 61 forms an offset voltage that is applied to amplifiers 45 and 55 in order to set the value of the voltage around which the output of amplifiers 45 and 55 swing, typically referred to as the common mode voltage. For example, assume that the internal operating voltage of regulator 42 is about three (3.0) volts. In such an example, the offset voltage may be set to about 1.5 volts and the output of amplifiers 45 and 55 may swing several milli-volts around the 1.5 volt common mode voltage provided by the offset voltage. Additionally, an operational amplifier 82 is used instead of amplifier 56 so that the offset voltage may be added to compensation amplifier 55. The offset voltage may also be added to the value of the buffered composite current feedback signal by a summing circuit 60 so that the buffered composite current feedback signal also has the same common mode voltage as amplifier 55. As a further improvement in the response of system 25 to changes in the value of the reference voltage, controller 81 may be configured to feed the reference voltage forward and add it to the compensated signal (CS). The reference voltage is received by a buffer 65. The buffered reference voltage signal on the output of buffer 65 is applied to an input of a summing circuit 62 that adds the averaged reference voltage to the compensated signal. Buffer 65 and summing circuit 62 provide a reference voltage feed forward function so that when the value of the reference voltage changes more rapidly. Summing the output of buffer 65 with CS bypasses the delays of compensation amplifier 55 to facilitate the output voltage better tracking the changes in the reference voltage. Thus, the amount of the change is added to the compensated signal (CS) which is received by controllers 66 and 73 through subtractors 44 and 51. The change in the value of the compensated signal immediately changes the inputs of comparators 67 and 74, thus, immediately changes the states of transistors 36 and 37 and the value of the output voltage between terminals 28 and 29.

In order to provide this additional functionality, an input of buffer 65 is connected to the output of reference 43, and an output of buffer 65 is connected to a first input of summing circuit 62. A second input of summing circuit 62 is connected to the output of amplifier 56, and an output of circuit 62 is commonly connected to the non-inverting inputs of subtractors 44 and 51. The output of buffer 64 is connected to a first input of summing circuit 60, and an output of circuit 60 is connected to the second terminal of impedance 59. An output of generator 61 is commonly connected to a first terminal of resistor 54, a second input of circuit 60, and to a non-inverting input of amplifier 56. An inverting input of amplifier 56 is commonly connected to the second terminal of impedance 57 and the first input of impedance 58. A second terminal of resistor 54 is connected to the inverting input of amplifier 46.

Figure 4:
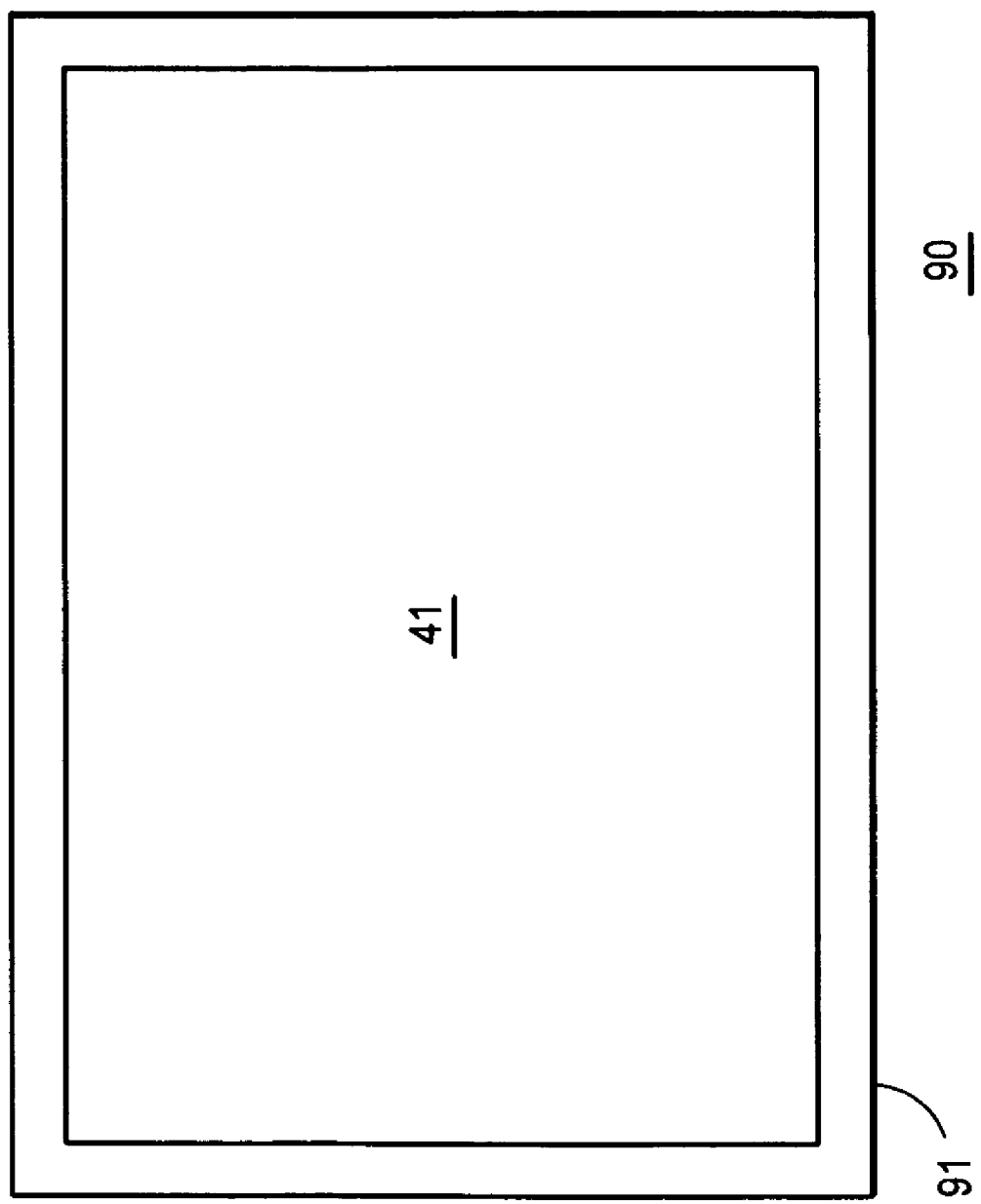
FIG. 4 schematically illustrates an enlarged plan view of a portion of an embodiment of a semiconductor device that includes the power supply controller of FIG. 2 in accordance with the present invention.

FIG. 4 schematically illustrates an enlarged plan view of a portion of an embodiment of a semiconductor device 95 that is formed on a semiconductor die 96. Controller 10 is formed on die 96. Die 96 may also include other circuits that are not shown in FIG. 3 for simplicity of the drawing. Controller 21 and device 95 are formed on die 96 by semiconductor manufacturing techniques that are well known to those skilled in the art.

In view of all of the above, it is evident that a novel device and method is disclosed. Included, among other features, is forming the error amplifier to amplify a reference signal and the feedback signal with substantially constant gain over frequency. The substantially constant gain improves the accuracy and the stability of the output voltage of the power supply system containing the error amplifier.

While the invention is described with specific preferred embodiments, it is evident that many alternatives and variations will be apparent to those skilled in the semiconductor arts.

The invention claimed is:

1. A method of controlling a power supply system having an output voltage comprising:
generating a feedback signal representative of the output voltage;
coupling a first gain control element of an error amplifier to receive the feedback signal and coupling a second gain control element of the error amplifier to receive a reference signal and configuring the error amplifier to amplify the reference signal and the feedback signal with substantially constant gain over an operating frequency of the error amplifier to form an error signal; and
compensating the error signal for frequency stability.

2. The method of claim 1 further including using the error signal to generate a PWM control signal.

3. The method of claim 2 wherein using the error signal to generate the PWM control signal includes compensating the error signal for stability after the step of generating the error signal and prior to using the error signal to generate the PWM control signal.

4. The method of claim 2 further including using the PWM control signal to control a power switch.

5. The method of claim 4 wherein using the error signal to generate the PWM control signal includes using a current sense signal that is representative of current through the power switch to generate the PWM control signal.

6. A method of forming a power supply controller comprising;

coupling an error amplifier to receive a feedback signal that is representative of a voltage external to the power supply controller;

coupling the error amplifier to receive a reference signal;

configuring the error amplifier to amplify the feedback signal with a first gain and the reference signal by a second gain to generate an error signal, wherein the first gain and the second gain are substantially constant over an operating frequency of the power supply controller; and coupling a compensation amplifier to receive the error signal and frequency compensate the error signal to form a compensated signal.

7. The method of claim 6 wherein configuring the error amplifier to amplify the feedback signal with the first gain and the reference signal by the second gain includes configuring the error amplifier to amplify the feedback signal by a first transfer function and the reference signal by a second transfer function that is substantially equal to the first transfer function.

8. The method of claim 6 wherein configuring the error amplifier to amplify the feedback signal with the first gain and the reference signal by the second gain includes configuring the error amplifier to amplify the feedback signal and the reference signal by substantially unity gain.

9. The method of claim 6 further including coupling a PWM controller to receive the error signal and responsively generates a PWM control signal usable to control a power control switch.

10. The method of claim 9 further including coupling the PWM controller to receive a current sense signal representative of a current through the power control switch.

11. The method of claim 6 further including configuring the power supply controller to compensate the error signal with a phase shift to form a compensated signal.

12. The method of claim 11 further including configuring the power supply controller to add the reference signal to the compensated signal.

13. The method of claim 6 further including configuring a plurality of PWM controllers to receive the error signal and responsively generate a plurality of PWM control signals that operate with different phases to control a plurality of power control switch.

14. A power supply controller comprising:

an error amplifier having a first input and a second input;

a first gain control element coupled to the first input to receive a reference signal; and a second gain control element coupled to the second input to receive a feedback signal that is representative of an output voltage of a power supply control system, the first gain control element and the second gain control element operably coupled to the error amplifier to amplify the feedback signal by a first gain and the reference signal by a second gain wherein the first gain and the second gain are substantially constant over an operating frequency range of the power supply controller.

15. The power supply controller of claim 14 wherein the error amplifier is configured to amplify the feedback signal by a first portion of a transfer function to form a first amplified signal, to amplify the reference signal by a second portion of the transfer function to form a second amplified signal, and to subtract the second amplified signal from the first amplified signal.

16. The power supply controller of claim 14 further including a FWM control channel operable to receive an output signal from the error amplifier and responsively generate a PWM control signal.

17. The power supply controller of claim 16 further including the PWM control channel coupled to receive a current sense signal representative of a charging current used to generate the output voltage.

18. The power supply controller of claim 14 wherein the power supply controller is a portion of a power supply control system that is configured to receive an input voltage and responsively form the output voltage on an output of the power supply control system.

19. The power supply controller of claim 14 further including a compensation amplifier configured to receive an output signal of the error amplifier and responsively apply a varying phase with frequency to at least a portion of the output signal of the error amplifier.

20. The power supply controller of claim 14 further including a plurality of PWM controllers configured to receive an output signal from the error amplifier and responsively control a plurality of power switches with a plurality of phases.

* * * * *